(12) United States Patent
Jones et al.

(10) Patent No.: US 7,599,213 B2
(45) Date of Patent: Oct. 6, 2009

(54) LOW SURFACE ENERGY COATINGS IN PROBE RECORDING

(75) Inventors: Paul Max Jones, Pittsburgh, PA (US); Earl Chrzaszcz Johns, Sewickley, PA (US); James Dillon Kiely, Sewickley, PA (US); Lei Li, Wexford, PA (US); Yiao-Tee Hsia, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 449 days.

(21) Appl. No.: 11/414,893

(22) Filed: May 1, 2006

(65) Prior Publication Data

US 2007/0253314 A1 Nov. 1, 2007

(51) Int. Cl.
*G11C 11/00* (2006.01)

(52) U.S. Cl. .................. 365/151; 369/126; 977/875; 977/947

(58) Field of Classification Search .............. 360/97.01, 360/235.2; 365/151, 145, 164; 369/126, 369/100; 427/535; 428/810; 430/199; 977/874, 977/875, 943, 947
See application file for complete search history.

(56) References Cited

U.S. PATENT DOCUMENTS

| | | | |
|---|---|---|---|
| 5,674,638 A | 10/1997 | Grill et al. | |
| 6,084,849 A * | 7/2000 | Durig et al. | 369/126 |
| 6,127,004 A * | 10/2000 | Hatwar et al. | 427/535 |
| 6,246,538 B1 | 6/2001 | Kasamatsu et al. | |
| 6,249,403 B1 * | 6/2001 | Tokisue et al. | 360/235.2 |
| 6,504,151 B1 * | 1/2003 | Mitchell et al. | 850/57 |
| 6,764,757 B1 | 7/2004 | Wu et al. | |
| 6,811,945 B2 * | 11/2004 | Kobayashi | 430/199 |
| 6,989,535 B2 * | 1/2006 | Tani et al. | 250/306 |
| 7,447,140 B2 * | 11/2008 | Lutwyche et al. | 369/126 |
| 2001/0018094 A1 | 8/2001 | Tokisue et al. | |
| 2006/0291271 A1 * | 12/2006 | Stark et al. | 365/151 |
| 2007/0041238 A1 * | 2/2007 | Belov | 365/151 |
| 2008/0089211 A1 * | 4/2008 | Chu et al. | 369/126 |
| 2008/0151597 A1 * | 6/2008 | Kiely et al. | 365/145 |
| 2008/0165568 A1 * | 7/2008 | Rust | 365/151 |
| 2008/0187780 A1 * | 8/2008 | Jones et al. | 428/810 |

OTHER PUBLICATIONS

B. Liu et al., "Meniscus Force Modeling and Study on the Fluctuation of Stiction/Friction Force in CSS Test Process", IEEE Transactions on Magnetics, vol. 33, No. 5, Sep. 1997, pp. 3121-3123.

(Continued)

*Primary Examiner*—Tuan T Nguyen
*Assistant Examiner*—Alexander Sofocleous
(74) *Attorney, Agent, or Firm*—Robert P. Lenart, Esq.; Pietragallo Gordon Alfano Bosick & Raspanti, LLP

(57) ABSTRACT

An apparatus includes a storage media having a surface coated with a lubricant, and a plurality of probes having tips contacting the lubricant, wherein the probes are coated with one of a fluorocarbon, perfluoropolyether, polytetrafluoroethylene, fluorinated ethylene propylene, polyethylene, or a hydrocarbon polymer.

19 Claims, 2 Drawing Sheets

OTHER PUBLICATIONS

A. Sato et al., "Head-Disk Interface Design For In-Contact Recording Using Wet Systems", IEEE Transactions on Magnetics, vol. 33, No. 5, Sep. 1997, pp. 3163-3165.

H. Tani, "Observation of PFPE Lubricant Film on Magnetic Disk Surface by Atomic Force Microscopy", IEEE Transactions on Magnetics, vol. 35, No. 5, Sep. 1999, pp. 2397-239.

E. Aston, "Scanning Probe Microscopy: An Overview of Scanning Tunneling and Atomic Force Microscopies", Laboratory demonstration for: A short course on Surface and Colloid Science, Univ. of Washington, Seattle, WA, Jul. 9-13, 2001, 19 pgs.

Y. Chen et al., "Molecular Dynamics Simulation of the Meniscus Formation Between Two Surfaces", Applied Physics Letters, vol. 79, No. 9, Aug. 27, 2001, pp. 1267-1269.

H. Matsuoka et al., "Dynamics of Liquid Meniscus Bridge of Intermittent Contact Slider", IEEE Transactions on Magnetics, vol. 38, No. 5, Sep. 2002, pp. 2135-2137.

H.-J. Butt et al., "Force Measurements With The Atomic Force Microcope: Technique, Interpretation and Applications", Surface Science Reports, vol. 59, 2005, pp. 1-2 and 65-79.

C. H. Mastrangelo, "Adhesion-Related Failure Mechanisms in Micromechanical Devices", Tribology Letters, pp. 1-13.

* cited by examiner

LOW SURFACE ENERGY COATINGS IN PROBE RECORDING

FIELD OF THE INVENTION

This invention relates to apparatus for reducing meniscus forces between a probe and a data storage media.

BACKGROUND OF THE INVENTION

In probe recording devices, compliant probes are mounted such that tips of the probes contact the surface of a storage media. Some form of actuator is included to provide relative movement of the probes and the storage media so that the probes can be positioned with respect to the media surface. The storage media is coated with a liquid lubricant to reduce the wear rate of the probes and the media at the contacting surfaces.

Due to the contact of the probes and the media lubricant, a meniscus is formed between the lubricant and the sides of the probes. This creates a force that pulls the probes toward the media and increases the contact stress between these surfaces and thus the wear rate, static friction and dynamic friction, which need to be minimized for tracking performance. The meniscus develops because of the non-zero interfacial energy between the probes and the liquid lubricant. In addition, due to the relative motion of the probes and media and the non-zero wear rate, debris can accumulate along the sides of the probes and impact the mechanical function of the probes.

It would be advantageous to provide a probe storage apparatus in which the meniscus force is minimized between the probes and the liquid lubricant.

SUMMARY OF THE INVENTION

This invention provides an apparatus comprising a storage media having a surface coated with a lubricant, and a plurality of probes having tips contacting the lubricant, wherein the probes are coated with one of a fluorocarbon, perfluoropolyether, polytetrafluoroethylene, fluorinated ethylene propylene, polyethylene, or a hydrocarbon polymer.

In another aspect, the invention provides an apparatus comprising a storage media having a surface coated with a lubricant, and a plurality of probes having tips contacting the lubricant, wherein the probes are coated with a self-assembled monolayer.

In yet another aspect, the invention provides an apparatus comprising a storage media having a surface coated with a lubricant, and a plurality of probes having tips contacting the lubricant, wherein the probes are coated with a low surface energy coating.

DETAILED DESCRIPTION OF THE INVENTION

Figure 1:
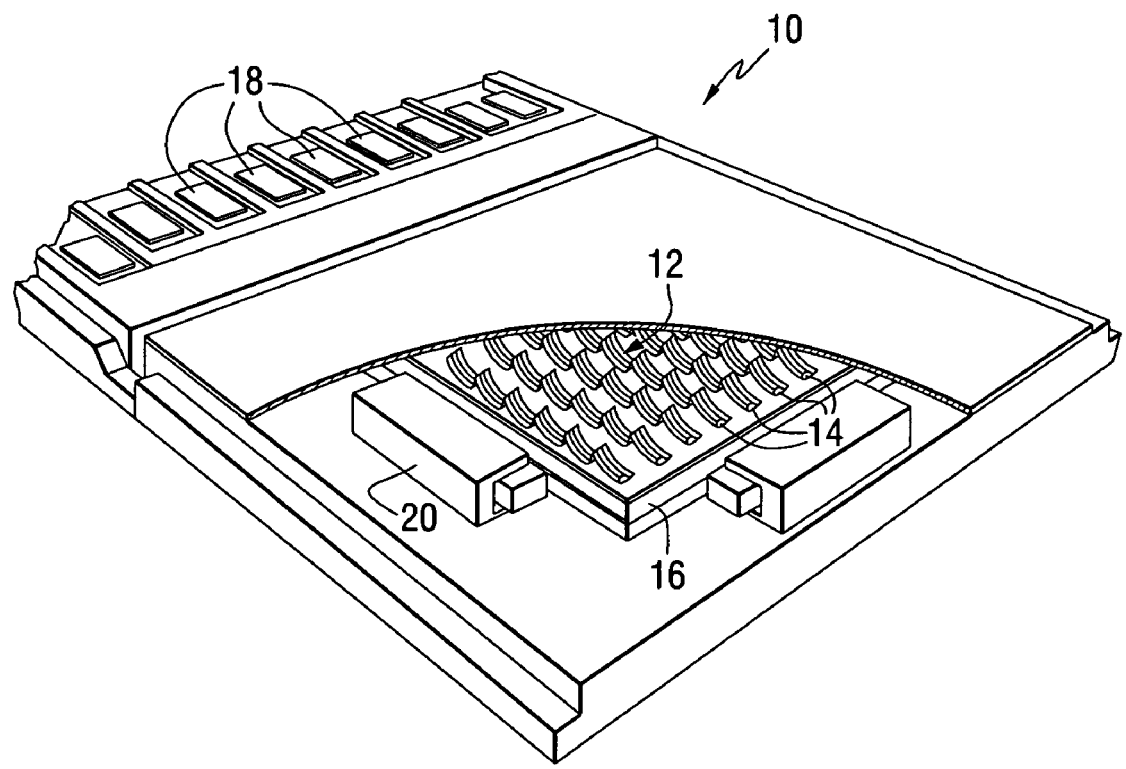
FIG. 1 is a perspective view of a probe storage device that can be constructed in accordance with an embodiment of the invention.

FIG. 1 is a perspective view of a probe storage device 10 that can be constructed in accordance with an embodiment of the invention. In the storage device 10 of FIG. 1, an array 12 of probes 14, also called tips or heads, are positioned adjacent to a storage media 16. In the configuration shown in FIG. 1 the probes 14 and the media 16 lie in planes that are generally parallel with each other. The probes 14 are electrically connected to connectors 18. The storage media 16 is coupled to at least one actuator 20, which is configured to move the media 16 relative to probes 14. This movement causes individual storage locations or domains on the media 16 to be moved relative to the heads. Each head can include one or more electrodes. The storage media in the example of FIG. 1 can be, for example, a ferroelectric or magnetic storage media. However, the invention is not limited to any particular type of storage media.

Figure 2:
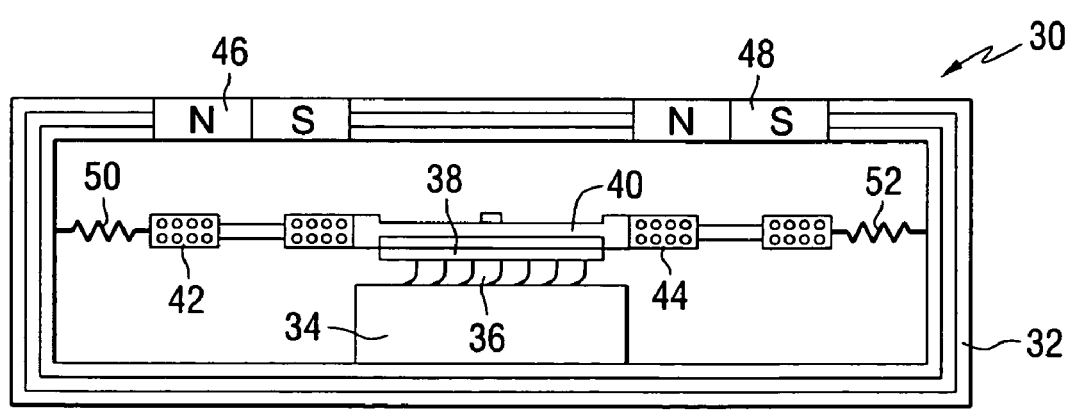
FIG. 2 is a schematic cross-sectional view of a probe storage device.

Probe storage devices may include actuators and suspension assemblies for providing relative movement between the storage media and the array of probes. FIG. 2 is a schematic cross-sectional view of a probe storage device 30. The device includes an enclosure 32, also referred to as a case, base, or frame, which contains a substrate 34. An array of probes 36 is positioned on the substrate. The probes extend upward to make contact with a storage media 38. The storage media 38 is mounted on a movable member, or sled 40. In this example, coils 42 and 44 are mounted on the movable member. Magnets 46 and 48 are mounted in the enclosure near the coils. Springs 50 and 52 form part of a suspension assembly that supports the movable member. The enclosure 32 can be formed of, for example, injection molded plastic.

The combination of coils and magnets forms actuators that are used to move the movable member. Electric current in the coils creates a magnetic field that interacts with the magnetic field produced by the magnets to produce a force that has a component in the plane of the movable member and causes linear movement of the movable member.

FIGS. 1 and 2 show one example of a probe storage device. However, other probe storage devices are known to include other types of actuators (such as electrostatic actuators) that provide relative movement between the probes and the storage media. Furthermore, the relative movement between the probes and the storage media can result from actuation of the probes toward or away from the media surface. While the present invention can be used in probe storage devices, it is not limited to any particular configuration of probe storage device components.

To reduce mechanical wear, the surface of the storage media is coated with a liquid lubricant. When the probes make contact with the media surface, the lubricant extends along the sides of the probes, forming a meniscus adjacent to the probe tip. The meniscus can cause forces that resist movement of the probe relative to the storage media. This invention provides an apparatus that reduces meniscus forces.

In one embodiment of the invention, the sides of the probes are coated with a low surface energy coating. As used herein, a low surface energy coating is a coating that provides a spreading coefficient, between the coating and the lubricant, of the proper sign and magnitude sufficient to yield a desired increase in the contact angle with the probe. The contact angle is the angle formed by the liquid lubricant at the three-phase boundary where a liquid lubricant, air, and the side of the probe intersect. The contact angle is determined by drawing a tangent at the contact point where the liquid and the solid intersect. It provides a quantitative measure of the wetting of the probe by the liquid lubricant. The desired contact angle may be determined by its effect on the functioning of the device, for example, by increasing the contact angle to minimize tracking errors.

Low surface energy coatings are readily available in solid and liquid form. Applying these coatings to sides of the probes will lower the interfacial energy between the probes and the liquid lubricant on the storage media, and will decrease the meniscus force and the adhesion of accumulated debris.

Figure 3:
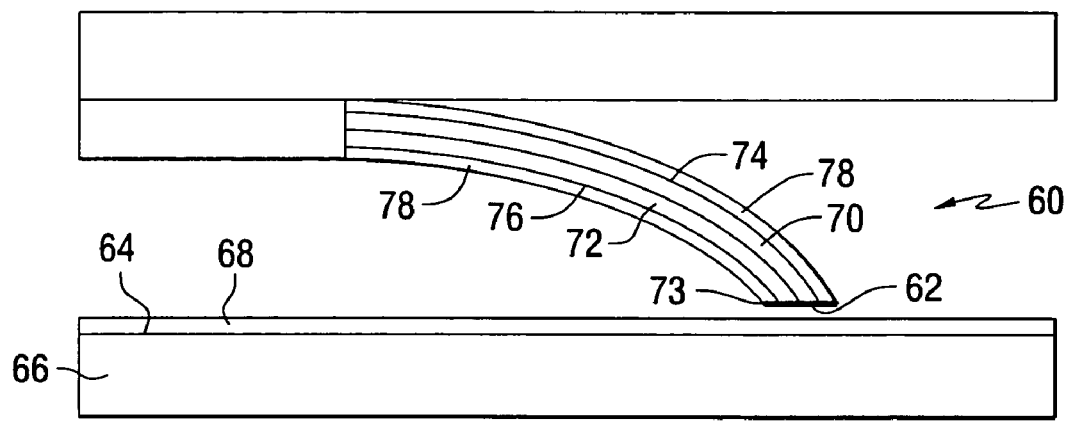
FIG. 3 is a schematic representation of a probe coated with a low surface energy coating that includes a tip positioned adjacent to a storage media.

FIG. 3 is a schematic representation of a probe 60 coated with a low surface energy coating. The probe includes a tip 62 positioned adjacent to a storage media. FIG. 3 depicts a released probe 60 wherein the tip 62 is adjacent to, but not in contact with, a surface 64 of a storage media 66 that has a thin layer of lubricant 68. The probe in this example includes a first layer 70, which can be for example Ta, Ti, V, or other metal, and a second layer 72, which is nonconductive and can be, for example, $Al_2O_3$, Si, $Si_3N_4$, or $SiO_2$. In addition, the probe has a narrow conductive layer 73 that is patterned at the tip, which can be made of Ru, PT, Rh, W, or other wear-resistant metals. The conductive layer at the tip provides the ability to apply an electrical potential to the media.

In the example of FIG. 3, the probe has a rectangular cross-sectional shape. While FIG. 3 only shows two sides 74 and 76 of the probe, all sides of the probe have been coated with a low surface energy coating 78. The coating should have a thickness of between 1 nm and 100 nm, enough to provide sufficient adhesion to the probe sides 74 and 76.

The lubricant on the media can be, for example, any pure (neat) or modified liquid that provides a significant decrease in the wear rate of the probe over the unlubricated media. Examples include, but are not limited to, perfluoropolyethers, nonfinctionalized hydrocarbons, polyester-based lubricants, and polyphenol ethers.

Figure 4:
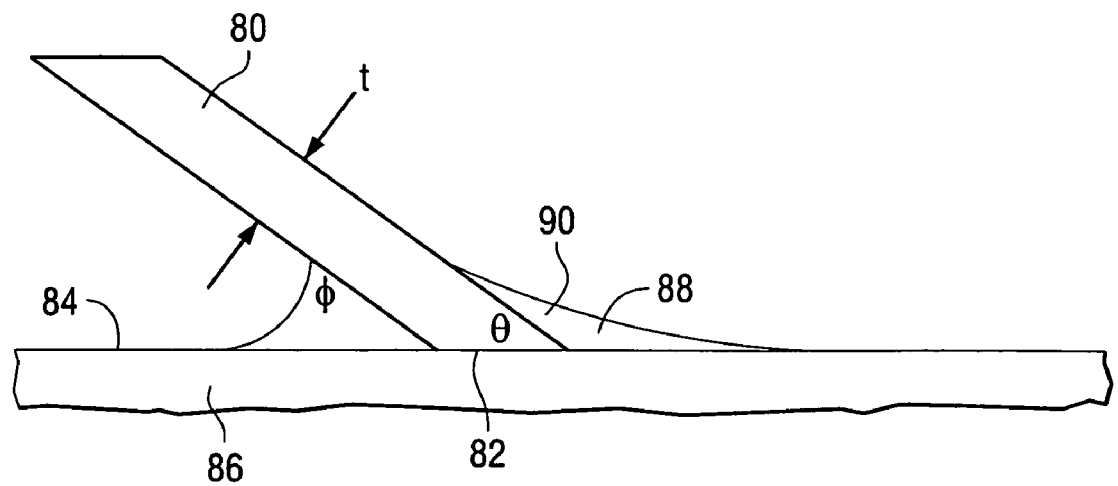
FIG. 4 is a schematic representation of a tilted probe with a meniscus.

The angle of contact of the probe with the surface plays an important role in the meniscus force. FIG. 4 is a schematic representation of a tilted probe 80, having a tip 82 in contact with a surface 84 of a storage media 86. Lubricant 88 on the surface of the media forms a meniscus 90.

The friction force $F_f$ between the probe and media can be written as:

$$F_f = \mu(F_N + F_m) + F_{vis}$$

where $\mu$ is the static friction coefficient, $F_N$ is the normal force, $F_m$ is the meniscus force, and $F_{vis}$ is the viscous force.

For a rectangularly shaped probe, the meniscus force can be written as:

$$F_m = 2\gamma \left(w + \frac{t}{\sin\theta}\right)(1 + \cos\phi)$$

where $\gamma$ is the surface energy, w is the width of the probe, t is the thickness of the probe, $\theta$ is the angle the probe makes the media surface, and $\phi$ is the angle of contact between the lubricant and the lower side of the probe. These relationships are illustrated in FIG. 4, with the width w of the probe being in a direction perpendicular to the plane of the figure. While this example assumes that the probe has a generally rectangular cross-section, other probe shapes can be used. For example, the probes can have a triangular, elliptical, or trapezoidal cross-section.

For the case of a probe that is 15 μm wide and 1 μm thick, contacting the media surface at $\theta \approx 45°$, a fully wetting media lubricant, such as perfluoropolyether (PFPE), which has $\phi \approx 0°$ and $\gamma \approx 25$ mN/m$^2$, would give a meniscus force of 1.7 μN in a direction that attracts the probe toward the media. The angle of the probe with respect to the surface of the media would be designed to meet system requirements, but is currently expected to be in the range of 15 to 90 degrees.

The meniscus force is independent of the normal force. However, if the probe sides are coated with a low surface energy film of, for example, a PFPE lubricant with a contact angle of ~90°, then a ~50% decrease in this force is expected, thereby lessening its deleterious effects.

It is widely known that mechanical interactions of contacting bodies, which take place in a fluid, result in a film build-up along the sides of the contacting members. This fluid build-up can affect the ability to hold the mechanical members in contact. The work of adhesion measures the strength of interaction between, for example, an accumulating film and a surface. As shown above, the strength of this interaction is related to $\cos\phi$. Thus by coating the sides of the probe with a low surface energy film, the adhesion of debris will be lessened and its rate of build-up will be lowered.

There are several commercially available low surface energy materials, such as liquid fluorocarbons that can be applied to the probe. In addition, solid fluorocarbon films can be used for the low surface energy coating material. Solid fluorocarbon films can be deposited using a number of deposition methods. For example, plasma enhanced chemical vapor deposition (PECVD) may be advantageous because it conformally coats complex geometries and is compatible with envisioned probe processing. The low surface energy coating can also be formed using physical vapor deposition.

Sputtering is another method that may be used to deposit low surface energy fluorocarbon films. Sputter-deposited thin polytetrafluoroethylene (PTFE, also known as Teflon®) films have low surface energy, as measured by the water contact angle. Because of the low surface energy of PTFE films, meniscus forces resulting from the lubricant on the storage media will be smaller. Another method of creating a low surface energy solid fluorocarbon film is via liquid deposition. Flurad™ FC-732, produced by 3M, is a commercially available liquid fluorocarbon that has been used to reduce the meniscus force between probes and PFPE lubricants. Self-assembled monolayers (SAMs), such as n-trichlorosilanes (with n=8 to 30), can also be used.

In one embodiment, deposition of low surface energy film could be incorporated into the current probe fabrication procedure. This would be an alternate approach to vapor deposition after the probes had been fabricated. In this approach, PTFE solid films could be deposited on one or both sides of the probe.

Additionally, it is possible that certain hydrocarbon films (such as high density polyethylene (HDPE), polyetheretherketone (PEEK), or polyimide could achieve the desired reduction in meniscus forces. The hydrocarbon coatings would be applied to the same probe surfaces, but any deposition process would be specific to the coating material.

This invention also reduces the amount of debris that can accumulate in the vicinity of the probe tips. Debris has been observed to accumulate at probe tips during operation of probe storage devices. Debris generation increases with the normal force on the probe. Coating the probe will reduce the meniscus force and will lower the amount of wear (or debris generation). Additionally, with a coating, the lubricant would have a lower work of adhesion and will not bond to the tip as readily. The rate of debris accumulation is thereby decreased and the overall amount of debris on the tip is lessened.

While the invention has been described in terms of several examples, it will be apparent to those skilled in the art that various changes can be made to the described examples without departing from the scope of the invention as set forth in the following claims.

What is claimed is:

1. An apparatus comprising:
    a storage media having a surface coated with a lubricant; and
    a plurality of probes having tips contacting the storage media and the lubricant, wherein sides of the probes are coated with one of a fluorocarbon, perfluoropolyether, polytetrafluoroethylene, fluorinated ethylene propylene, polyethylene, or a hydrocarbon polymer, and the tips of the probes are uncoated.

2. The apparatus of claim 1, wherein the probes contact the media surface at an angle in the range of 15 to 90 degrees.

3. The apparatus of claim 1, wherein each of the probes comprises:
    a first layer of metal; and
    a second layer of nonconductive material.

4. The apparatus of claim 3, wherein:
    the first layer comprises one of Ta, Ti, or V; and
    the second layer comprises one of $Al_2O_3$, Si, $Si_3N_4$, or $SiO_2$.

5. The apparatus of claim 3, wherein each of the probes further comprises:
    a conductive layer at the tip.

6. The apparatus of claim 5, wherein the conductive layer comprises one of Ru, Pt, Rh, or W.

7. The apparatus of claim 1, further comprising:
    an actuator for providing relative movement between the storage media and the tips.

8. The apparatus of claim 1, wherein the angle of contact between one of the sides of the probes and the lubricant is about 90°.

9. An apparatus comprising:
    a storage media having a surface coated with a lubricant; and
    a plurality of probes having tips contacting the lubricant, wherein the probes are coated with a self-assembled monolayer, wherein the self-assembled monolayer comprises an n-trichlorosilane, with n being a number in the range of 8 to 30.

10. The apparatus of claim 9, wherein the probes contact the media surface at an angle in the range of 15 to 90 degrees.

11. The apparatus of claim 9, wherein sides of the probes are coated.

12. The apparatus of claim 9, wherein each of the probes comprises:
    a first layer of metal; and
    a second layer of nonconductive material.

13. The apparatus of claim 12, wherein:
    the first layer comprises one of Ta, Ti, or V; and
    the second layer comprises one of $Al_2O_3$, Si, $Si_3N_4$, or $SiO_2$.

14. The apparatus of claim 12, wherein each of the probes further comprises:
    a conductive layer at the tip.

15. The apparatus of claim 14, wherein the conductive layer comprises one of Ru, Pt, Rh, or W.

16. An apparatus comprising:
    a storage media having a surface coated with a lubricant; and
    a plurality of probes having tips contacting the storage media and the lubricant, wherein sides of the probes are coated with a low surface energy coating, and the tips of the probes are uncoated.

17. The apparatus of claim 16, wherein the low surface energy coating has a thickness in the range of 1 nm to 100 nm.

18. The apparatus of claim 16, wherein the low surface energy coating is formed using one of: physical vapor deposition, plasma enhanced chemical vapor deposition, sputtering liquid deposition, or vapor phase deposition.

19. The apparatus of claim 16, wherein the angle of contact between one of the sides of the probes and the lubricant is about 90°.

* * * * *

UNITED STATES PATENT AND TRADEMARK OFFICE
CERTIFICATE OF CORRECTION

PATENT NO. : 7,599,213 B2  Page 1 of 1
APPLICATION NO. : 11/414893
DATED : October 6, 2009
INVENTOR(S) : Jones et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this

Twenty-eighth Day of September, 2010

David J. Kappos
*Director of the United States Patent and Trademark Office*